United States Patent
Wu et al.

(10) Patent No.: US 9,874,967 B2
(45) Date of Patent: Jan. 23, 2018

(54) TOUCH-PANEL DISPLAY DEVICE

(71) Applicant: TPK Touch Solutions (Xiamen) Inc., Xiamen (CN)

(72) Inventors: Xiaoyan Wu, Kunshan (CN); Huilin Ye, Zhangzhou (CN); Jing Yu, Xiamen (CN); Tsung-Ke Chiu, Tainan (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 11 days.

(21) Appl. No.: 14/712,875

(22) Filed: May 14, 2015

(65) Prior Publication Data
US 2015/0331515 A1 Nov. 19, 2015

(30) Foreign Application Priority Data
May 15, 2014 (CN) .......................... 2014 1 0205301

(51) Int. Cl.
| | |
|---|---|
| G06F 3/041 | (2006.01) |
| G06F 3/044 | (2006.01) |
| G02F 1/1333 | (2006.01) |
| B32B 17/10 | (2006.01) |
| G09G 3/36 | (2006.01) |
| B32B 17/06 | (2006.01) |
| G06F 3/042 | (2006.01) |
| B32B 27/08 | (2006.01) |
| G09G 3/3208 | (2016.01) |
| G02F 1/1335 | (2006.01) |

(52) U.S. Cl.
CPC ............ G06F 3/0416 (2013.01); B32B 17/06 (2013.01); B32B 17/1055 (2013.01); B32B 27/08 (2013.01); G02F 1/13338 (2013.01); G06F 3/042 (2013.01); G06F 3/044 (2013.01); G06F 3/0412 (2013.01); G09G 3/3208 (2013.01); G09G 3/36 (2013.01); B32B 2457/202 (2013.01); B32B 2457/206 (2013.01); B32B 2457/208 (2013.01); G02F 1/133528 (2013.01); G06F 2203/04103 (2013.01)

(58) Field of Classification Search
None
See application file for complete search history.

(56) References Cited

U.S. PATENT DOCUMENTS 6,411,353 B1 * 6/2002 Yarita ............... G02F 1/133308
349/150
8,289,457 B2 * 10/2012 Hwang ............... G02F 1/13338
349/106
8,294,677 B2 * 10/2012 Wu ......................... G06F 3/044
178/18.06

(Continued)

Primary Examiner — Patrick F Marinelli
(74) Attorney, Agent, or Firm — Paul David Bendemire

(57) ABSTRACT

The present disclosure provides a touch-panel display device. The touch-panel display device comprises a substrate, a display module, a sensing module and a function layer. The substrate includes a first surface and a second surface on opposite sides of the substrate, respectively. The display module is proximal to the first surface of the substrate, and the sensing module is disposed between the display module and the substrate. The function layer, disposed on either the first surface or the second surface of the substrate, is configured to polarize light emitted from the display module towards the substrate.

12 Claims, 14 Drawing Sheets

(56) References Cited

U.S. PATENT DOCUMENTS

| | | | |
|---|---|---|---|
| 2003/0142250 A1* | 7/2003 | Kawahara | G02B 5/305 349/96 |
| 2003/0179323 A1* | 9/2003 | Abileah | G02F 1/13338 349/24 |
| 2005/0231487 A1* | 10/2005 | Ming | G02F 1/13338 345/173 |
| 2006/0007165 A1* | 1/2006 | Yang | G06F 3/0412 345/173 |
| 2007/0132918 A1* | 6/2007 | Pan | G02B 6/0046 349/96 |
| 2007/0171355 A1* | 7/2007 | Chung | G02F 1/133528 349/194 |
| 2007/0263129 A1* | 11/2007 | Park | G02F 1/13338 349/12 |
| 2007/0279359 A1* | 12/2007 | Yoshida | G09G 3/2025 345/89 |
| 2008/0030656 A1* | 2/2008 | Watson | G02F 1/133536 349/96 |
| 2008/0055295 A1* | 3/2008 | Abileah | G02F 1/13338 345/204 |
| 2009/0008161 A1* | 1/2009 | Jones | G06F 3/044 178/18.06 |
| 2009/0160817 A1* | 6/2009 | Wu | G06F 3/044 345/173 |
| 2010/0164881 A1* | 7/2010 | Kuo | G06F 3/044 345/173 |
| 2011/0141036 A1* | 6/2011 | Hsu | G06F 3/044 345/173 |
| 2011/0199332 A1* | 8/2011 | Hung | G06F 3/044 345/174 |
| 2011/0254802 A1* | 10/2011 | Philipp | G06F 3/0412 345/174 |
| 2012/0033168 A1* | 2/2012 | Hwang | G02F 1/13338 349/139 |
| 2012/0127194 A1* | 5/2012 | Richards | G09G 5/026 345/590 |
| 2012/0200337 A1* | 8/2012 | Liu | G06F 3/044 327/517 |
| 2013/0094220 A1* | 4/2013 | Jin | G02B 5/045 362/339 |
| 2013/0100039 A1* | 4/2013 | Hong | B32B 37/1207 345/173 |
| 2013/0135328 A1* | 5/2013 | Rappoport | G06F 3/0481 345/522 |
| 2013/0342589 A1* | 12/2013 | Jung | G09G 3/32 345/690 |
| 2014/0043561 A1* | 2/2014 | Byeon | G02F 1/133308 349/58 |
| 2014/0049453 A1* | 2/2014 | Lee | G09G 3/20 345/55 |
| 2014/0176826 A1* | 6/2014 | Kim | G06F 3/0416 349/12 |
| 2014/0320758 A1* | 10/2014 | Leung | G06F 3/044 349/12 |
| 2014/0340906 A1* | 11/2014 | Han | F21K 9/135 362/294 |
| 2015/0029143 A1* | 1/2015 | Kang | G06F 1/1652 345/174 |
| 2015/0123885 A1* | 5/2015 | Adachi | G09G 3/3208 345/77 |
| 2015/0153781 A1* | 6/2015 | Yang | G06F 1/1656 349/12 |
| 2015/0160767 A1* | 6/2015 | Song | G06F 3/0412 345/174 |
| 2015/0219950 A1* | 8/2015 | Kim | G02F 1/133308 349/96 |
| 2015/0220183 A1* | 8/2015 | Youngs | G06F 3/044 345/173 |
| 2015/0228089 A1* | 8/2015 | Perdices-Gonzalez | G09G 3/348 345/592 |
| 2015/0285956 A1* | 10/2015 | Schmidt | G02B 1/005 359/352 |
| 2015/0301652 A1* | 10/2015 | Yang | G06F 3/041 345/174 |
| 2015/0331515 A1* | 11/2015 | Wu | G06F 3/0416 345/175 |
| 2015/0331537 A1* | 11/2015 | Wu | G06F 3/0416 345/173 |
| 2016/0062529 A1* | 3/2016 | Jeng | G06F 3/041 345/173 |
| 2016/0283025 A1* | 9/2016 | Yang | G06F 3/044 |
| 2016/0300890 A1* | 10/2016 | Ahn | H01L 27/323 |
| 2017/0144408 A1* | 5/2017 | Sata | B32B 5/16 |
| 2017/0277291 A1* | 9/2017 | Lee | G06F 3/041 |

* cited by examiner

TOUCH-PANEL DISPLAY DEVICE

BACKGROUND OF THE INVENTION

This Application claims priority of the People's Republic of China Patent Application No. CN201410205301.8, filed on May 15, 2014, the entirety of which is incorporated by reference herein

FIELD OF THE INVENTION

The present invention relates to touch-sensitive technology and, more particularly, to a touch-panel display device.

DESCRIPTION OF THE RELATED ART

Touch panels or touch screens have become more and more popular in electronic devices including, in particular, portable or hand-held devices such as personal digital assistants (PDAs) and mobile phones.

In a touch-panel display device, the transparent conductive substrate of the touch panel generally includes an optically transmissive substrate and a transparent patterned conductive layer. In general, to form the transparent conductive substrate, a transparent conductive layer of, for example, indium tin oxide (ITO) is coated on a non-conductive, optically transmissive substrate. Subsequently, a sensing electrode layer is formed by a photolithography process followed by an etching process. The sensing electrode layer includes an ITO region (i.e., the electrode region) and an etched region. Since a conductive film is absent from the etched region, light directly impinges the transparent substrate. However, the refractive index of the ITO region is different from that of the etched region. As a result, a line of etch at an interface between the ITO region and the etched region can be clearly observed by a viewer, which may seriously affect the appearance of the touch panel.

To address the issue, an index match (IM) layer is adopted. The IM layer, however, is relatively thick and suffers a laborious process, which inevitably increase the manufacturing cost. Moreover, such IM layers are disadvantageous to the downscaling of touch panels.

It may therefore be desirable to reduce the visibility of the line of etch in the sensing electrode layer so as to enhance the visual effect of a touch panel, and also to save the manufacturing cost and facilitate downscaling of a touch-panel display device.

SUMMARY OF THE INVENTION

The present disclosure provides a touch-panel display device to overcome or alleviate the above-mentioned issues. The touch-panel display device comprises a substrate, a display module, a sensing module and a function layer. The substrate includes a first surface and a second surface on opposite sides of the substrate, respectively. The display module is proximal to the first surface of the substrate, and the sensing module is disposed between the display module and the substrate. The function layer, disposed on either the first surface or the second surface of the substrate, is configured to polarize light emitted from the display module towards the substrate.

In an embodiment, the display module includes a liquid crystal module comprising a first polarizer and a liquid crystal layer, and the function layer serves as a second polarizer for the liquid crystal module. The first polarizer is configured to polarize light incident upon the liquid crystal layer, and the function layer is configured to polarize light emergent from the liquid crystal layer. The polarization direction of the first polarizer is orthogonal to that of the function layer.

In another embodiment, the display module includes an organic light emitting diode (OLED) module comprising an organic light emitting layer. The function layer serves as a polarizer for the OLED module and is configured to polarize light emergent from the organic light emitting layer.

In still another embodiment, the polarizer includes a circular polarizer.

In yet another embodiment, the substrate is divided into a viewable area and a non-viewable area distinct from the viewable area, and the function layer only covers the viewable area.

In yet still another embodiment, the substrate is divided into a viewable area and a non-viewable area distinct from the viewable area, and the function layer covers the viewable area and extends into the non-viewable area.

In an embodiment, the function layer extends a length of 0.1 millimeter (mm) to 0.2 mm from the viewable area into the non-viewable area of the substrate.

In another embodiment, the substrate is divided into a viewable area and a non-viewable area distinct from the viewable area, and the function layer covers the viewable area and the non-viewable area of the substrate.

In still another embodiment, the touch-panel display device further comprises a coating. The coating includes one of an anti-split (AS) film, anti-glare (AG) film, anti-reflection (AR) film and anti-fingerprint (AF) film.

In yet another embodiment, the function layer includes an etched surface for diffuse reflection of light incident thereupon.

In yet still another embodiment, the function layer includes a nano-coating for diffuse reflection of light incident thereupon.

In an embodiment, the sensing module includes a sensing electrode layer on the first surface of the substrate.

In another embodiment, the touch-panel display device further comprises a first carrier between the substrate and the display module. Moreover, the sensing module includes a sensing electrode layer on the first carrier.

In still another embodiment, the touch-panel display device further comprises a first carrier between the substrate and the display module, and a second carrier between the first carrier and the display module. Moreover, the sensing module includes a first sensing electrode layer on the first carrier, and a second sensing electrode layer on the second carrier.

In yet another embodiment, at least one of the sensing electrode layer, the first sensing electrode layer or the second sensing electrode layer includes a material selected from one of metal oxides, nanometals, carbon nanotubes and graphene.

In yet still another embodiment, at least one of the substrate, the first carrier or the second carrier includes an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS).

In the above-mentioned embodiments, the function layer may cover only the viewable area of the substrate. Effectively, color difference in the viewable area due to a line of etch between an etched region and a non-etched region (such as an ITO region) is alleviated or overcome. The problem of color difference obviously would adversely affect the visual effect of a touch-panel display device.

Moreover, the function layer not only covers the viewable area, but also may extend into the non-viewable area to allow light emitting from a backlight source of the display module to enter the function layer. Effectively, leakage of light is alleviated or overcome.

Furthermore, the function layer may fully cover the viewable area and the non-viewable area of the substrate so as to reduce the color difference between reflected light from a masking layer and that from the viewable area. As a result, the viewable area and the non-viewable area appear to have a consistent color. Effectively, the problem of color difference is alleviated or overcome.

Further, the function layer serves as a polarizer for the display module according to the present invention. As compared to some existing LCDs or OLEDs, the inventive touch-panel display device eliminates the need of a polarizer that would otherwise be indispensable in the existing structures.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by persons having ordinary skill in the art that the conception and specific embodiment disclosed may be readily utilized as a basis for modifying or designing other structures or processes for carrying out the same purposes of the present invention. It should also be realized by persons having ordinary skill in the art that such equivalent constructions do not depart from the spirit and scope of the invention as set forth in the appended claims.

BRIEF DESCRIPTION OF THE DRAWINGS

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to persons having ordinary skill in the art to which the disclosure relates. Reference numerals may be repeated throughout the embodiments, but this does not necessarily require that feature(s) of one embodiment apply to another embodiment, even if they share the same reference number.

It will be understood that when an element is referred to as being "connected to" or "coupled to" another element, it may be directly connected to or coupled to the other element, or intervening elements may be present.

Figure 1A:
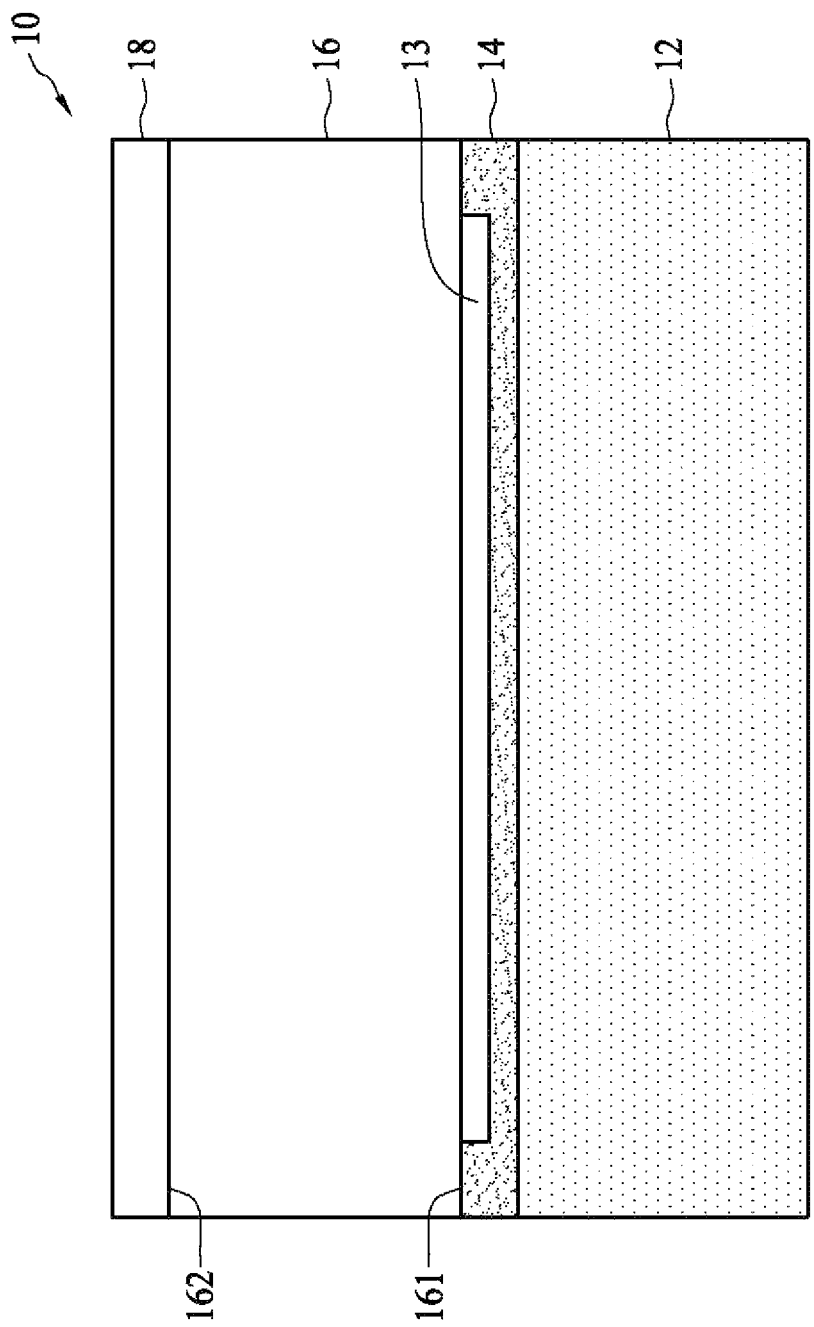

The objectives and advantages of the present invention are illustrated with the following description and upon reference to the accompanying drawings, in which:

FIG. 1A is a schematic cross-sectional view of a touch-panel display device, in accordance with an embodiment of the present invention.

Figure 1C:
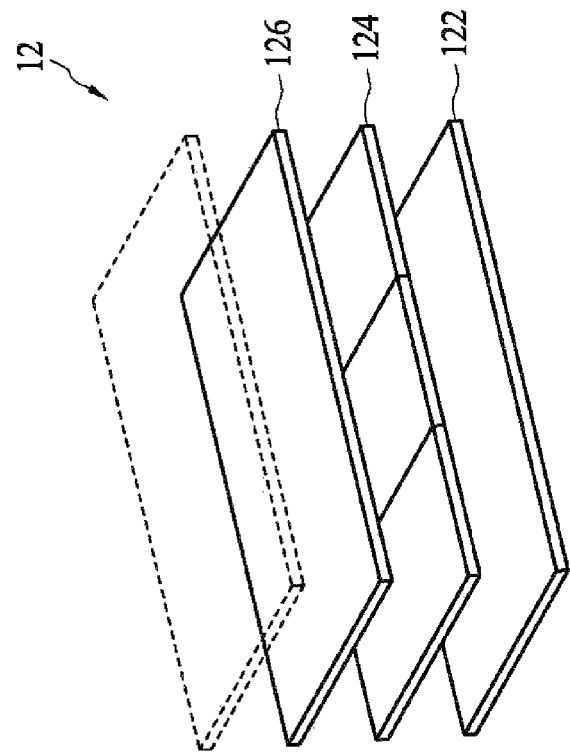
Figure 1B:
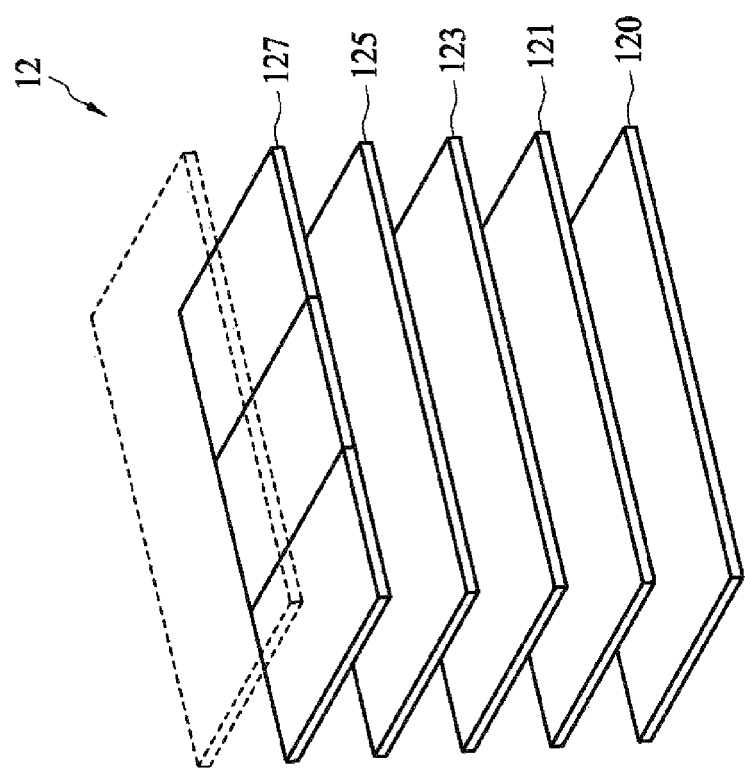

FIG. 1B is a schematic view of a display module, in accordance with an embodiment of the present invention.

FIG. 1C is a schematic view of a display module, in accordance with another embodiment of the present invention.

Figure 2:
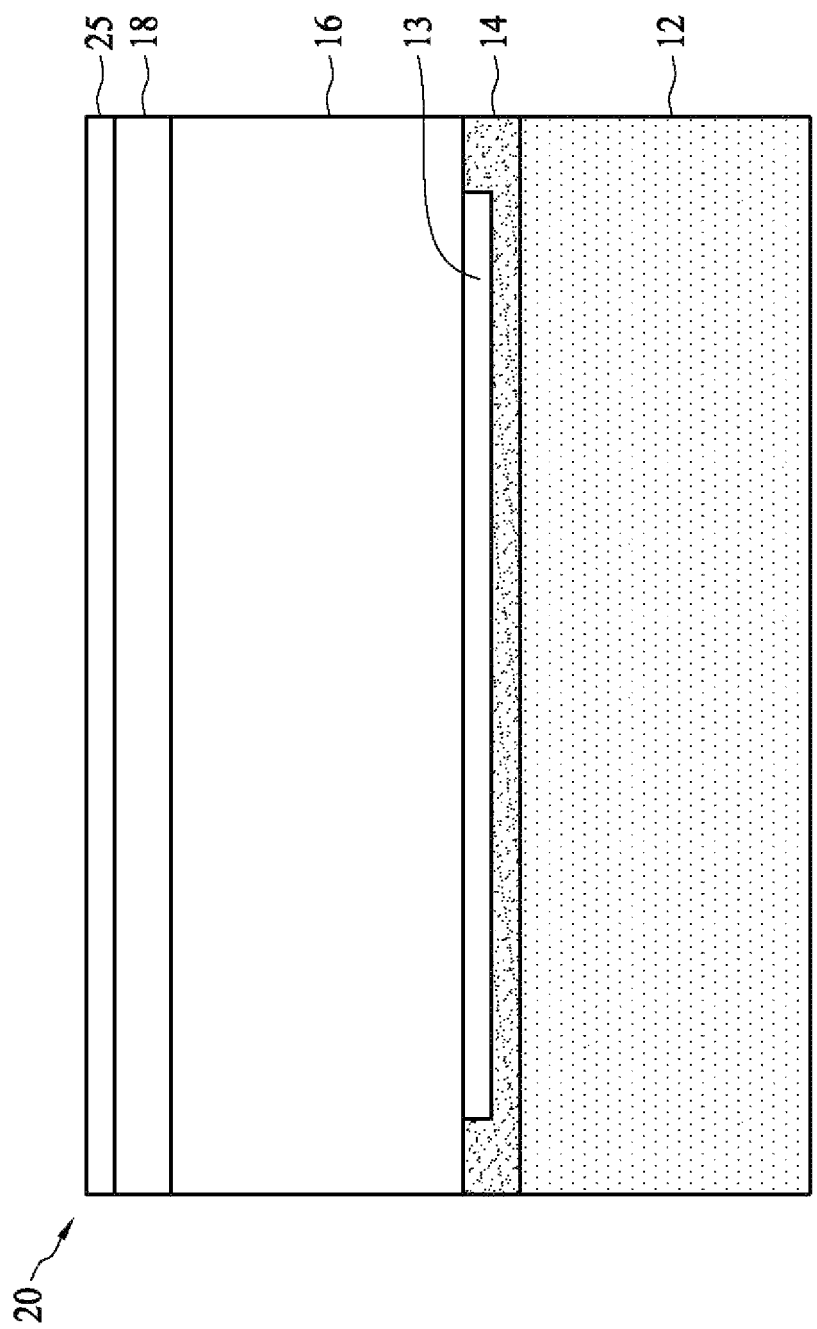

FIG. 2 is a schematic cross-sectional view of a touch-panel display device, in accordance with another embodiment of the present invention.

Figure 3A:
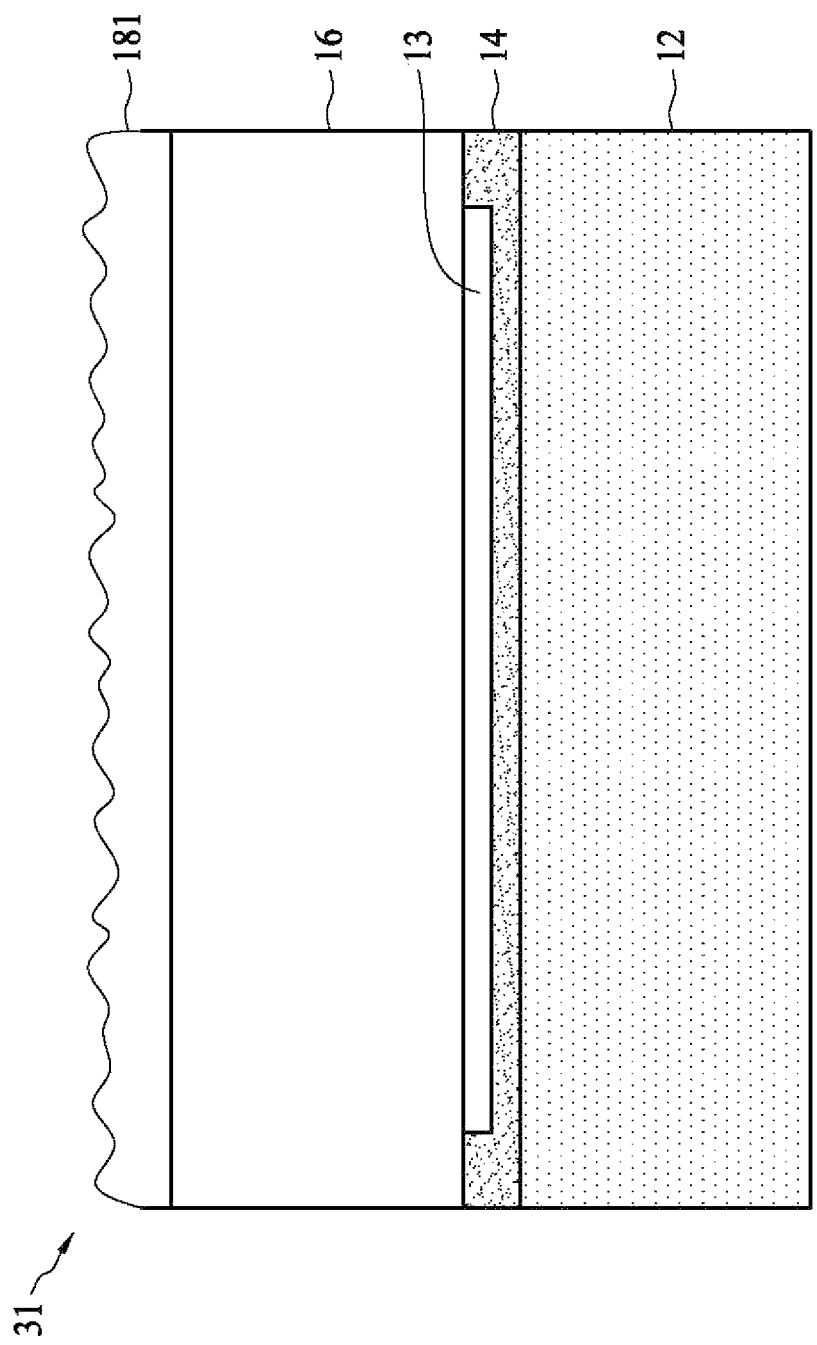

FIG. 3A is a schematic view of a function layer of a touch-panel display device, in accordance with an embodiment of the present invention.

Figure 3B:
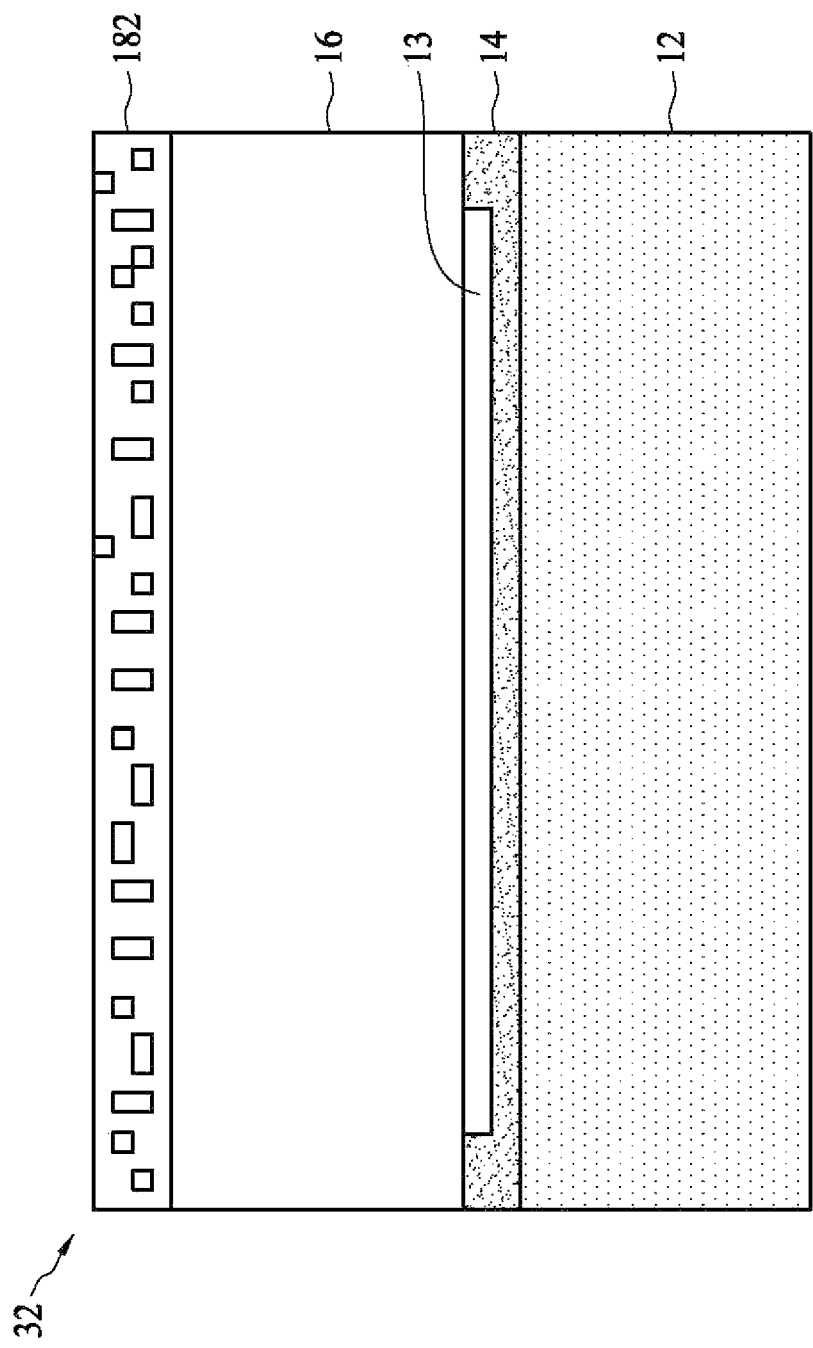

FIG. 3B is a schematic view of a function layer of a touch-panel display device, in accordance with an embodiment of the present invention.

Figure 4:
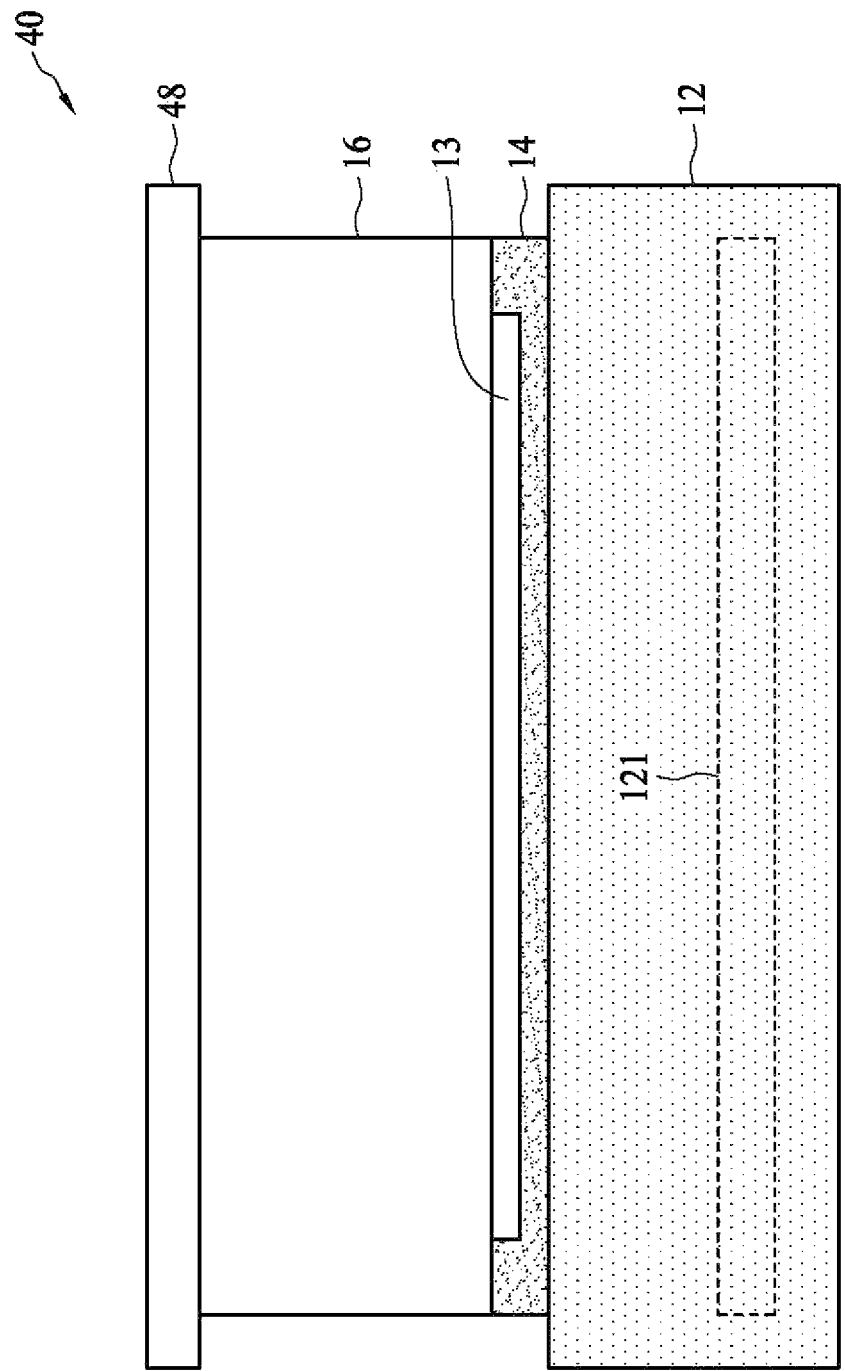

FIG. 4 is a schematic cross-sectional view of a touch-panel display device, in accordance with yet another embodiment of the present invention.

Figure 5A:
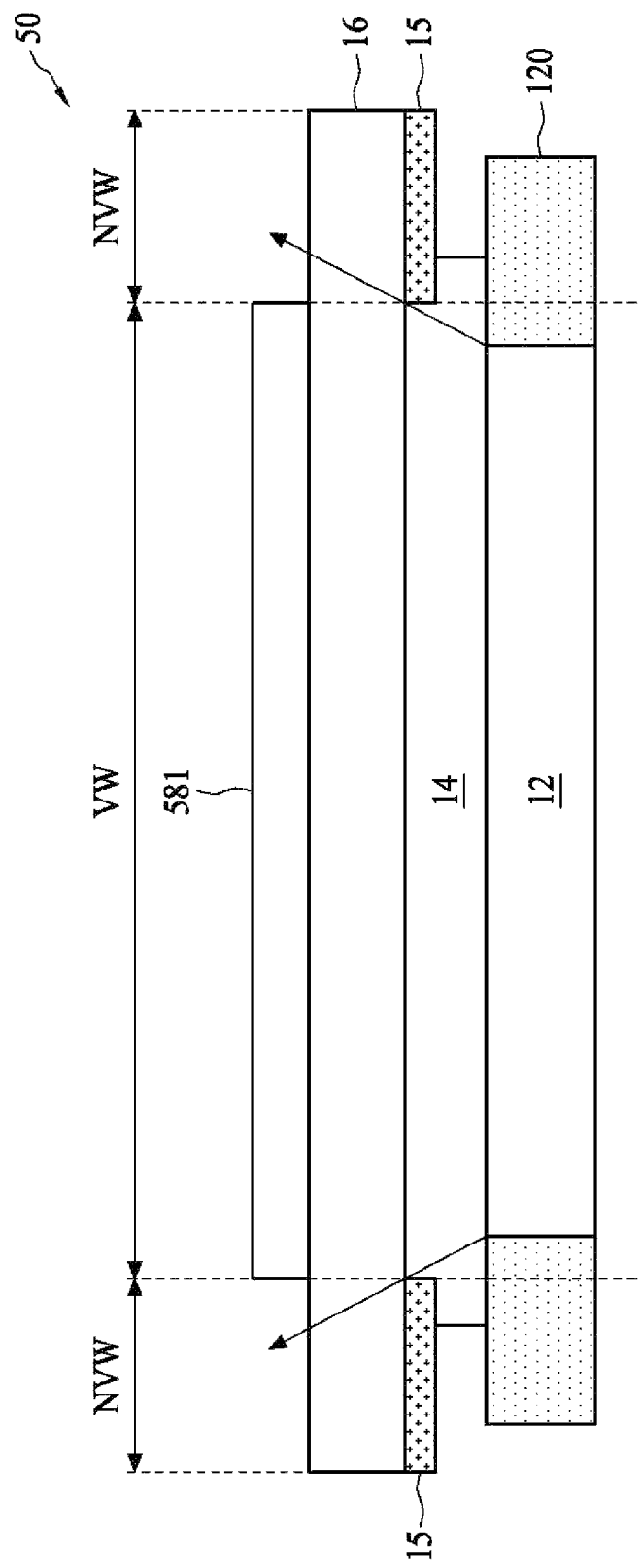

FIG. 5A is a schematic cross-sectional view of a touch-panel display device, in accordance with still another embodiment of the present invention.

Figure 5B:
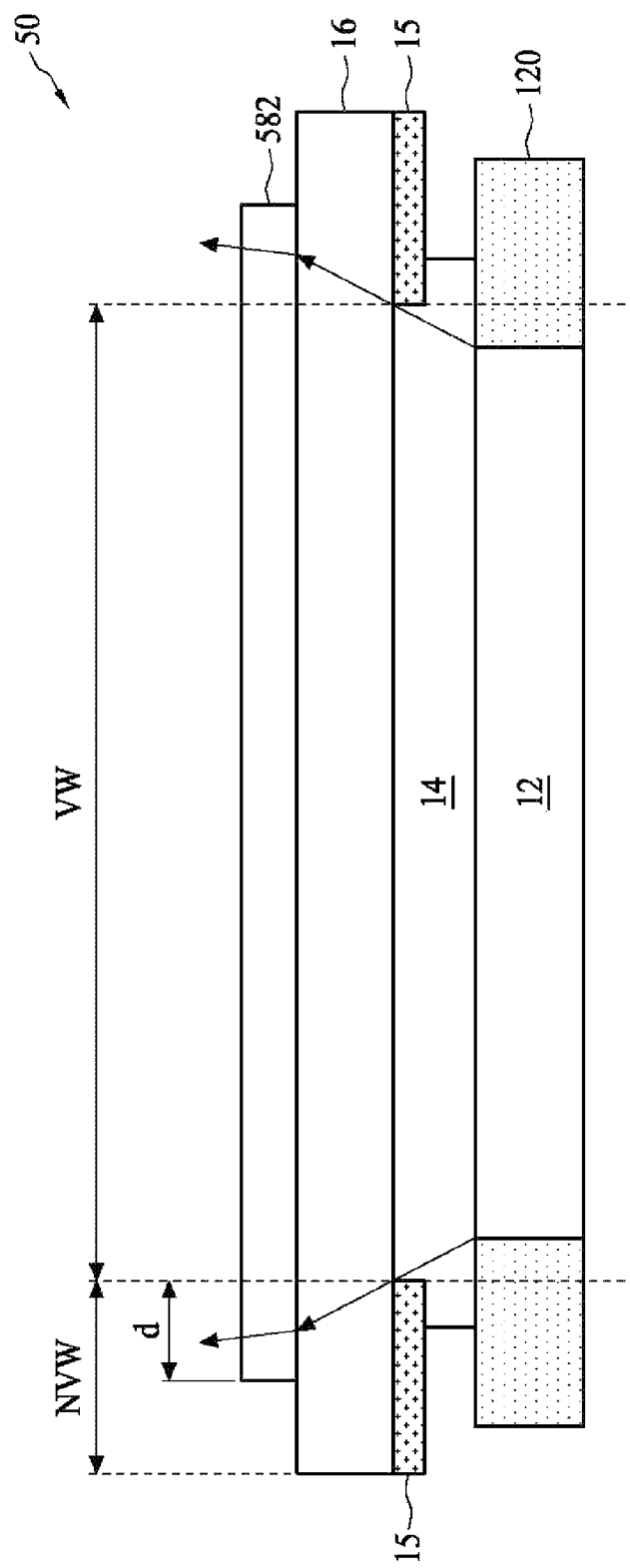

FIG. 5B is a schematic cross-sectional view of a touch-panel display device, in accordance with yet still another embodiment of the present invention.

Figure 5C:
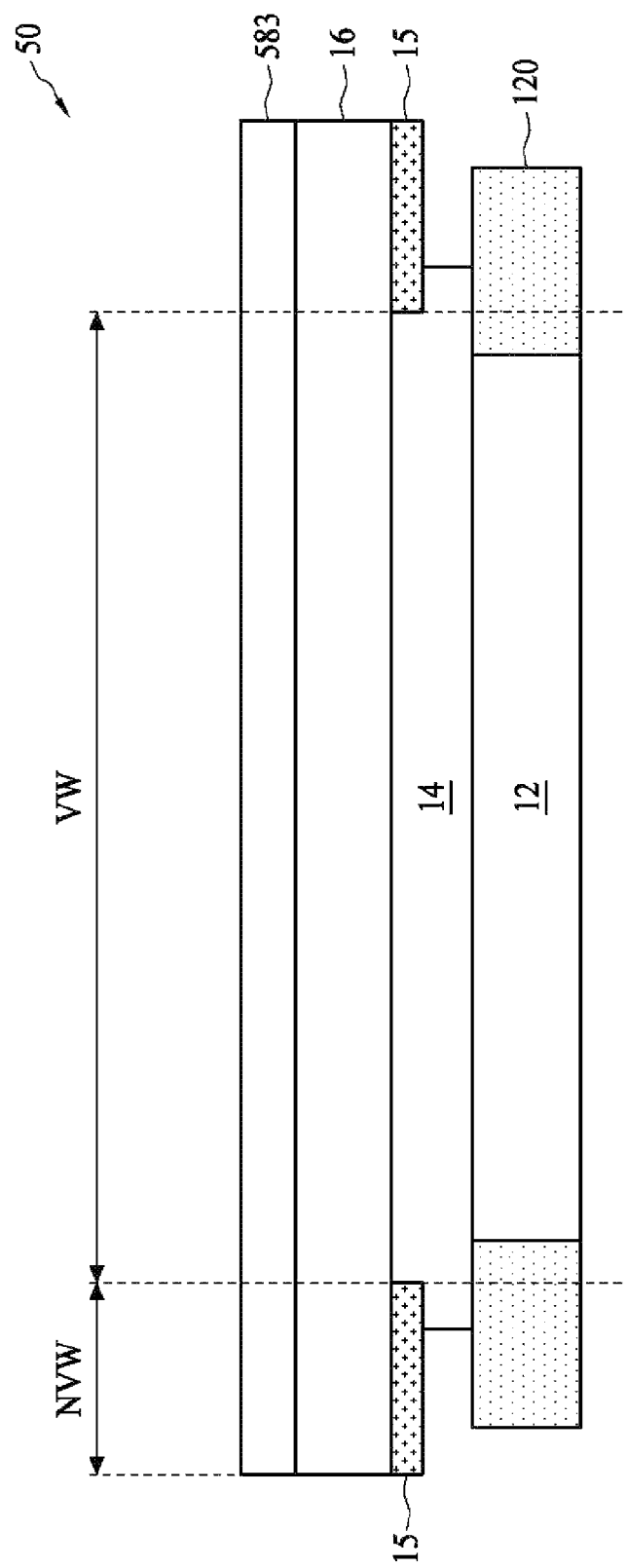

FIG. 5C is a schematic cross-sectional view of a touch-panel display device, in accordance with a further embodiment of the present invention.

Figure 6A:
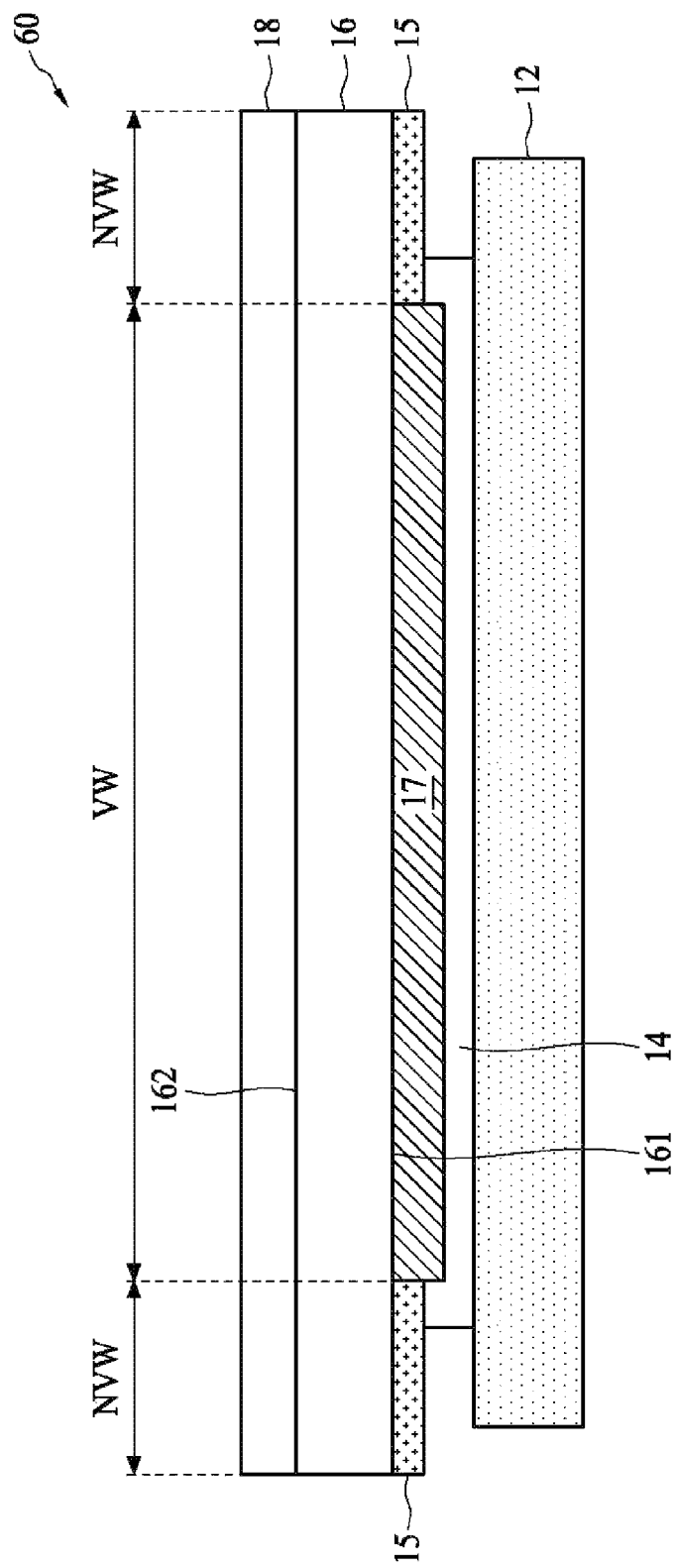

FIG. 6A is a schematic cross-sectional view of a touch-panel display device, in accordance with an embodiment of the present invention.

Figure 6B:
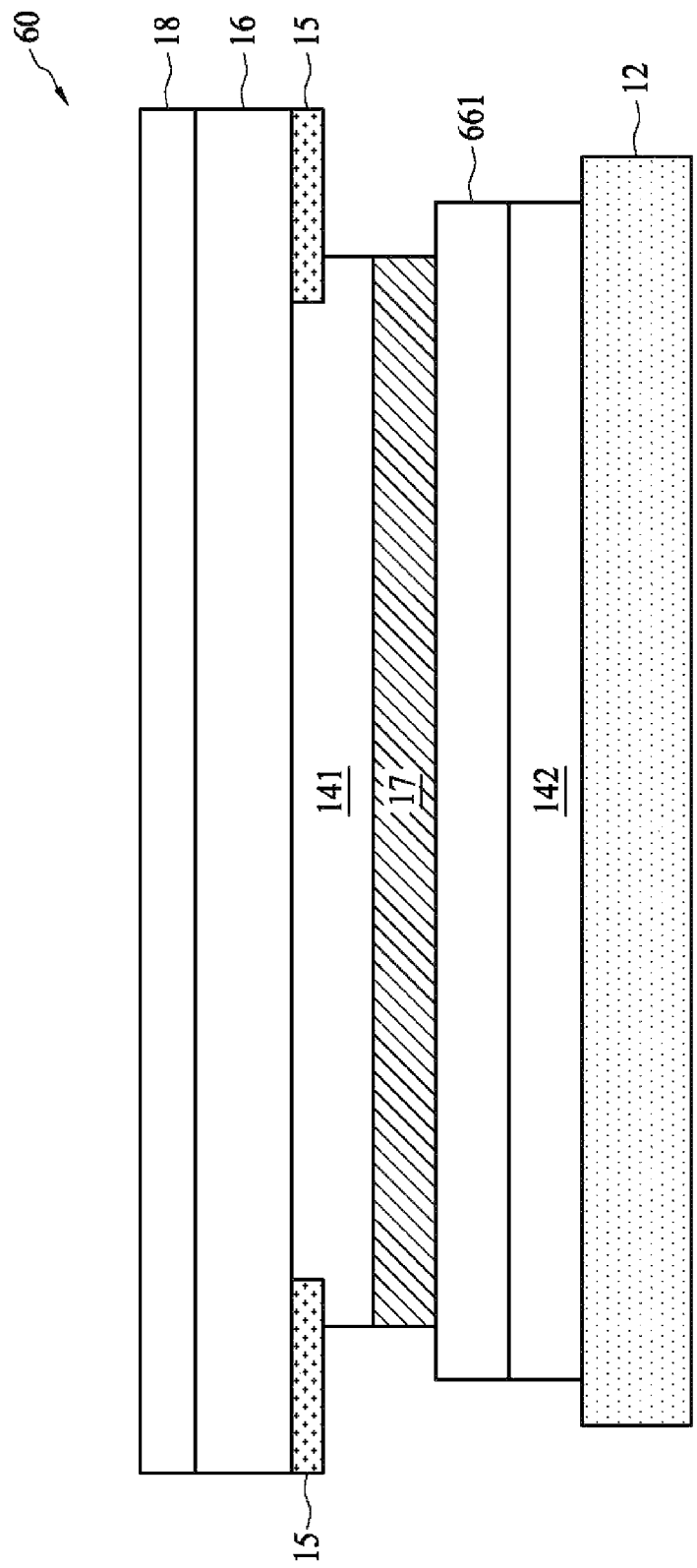

FIG. 6B is a schematic cross-sectional view of a touch-panel display device, in accordance with another embodiment of the present invention.

Figure 6C:
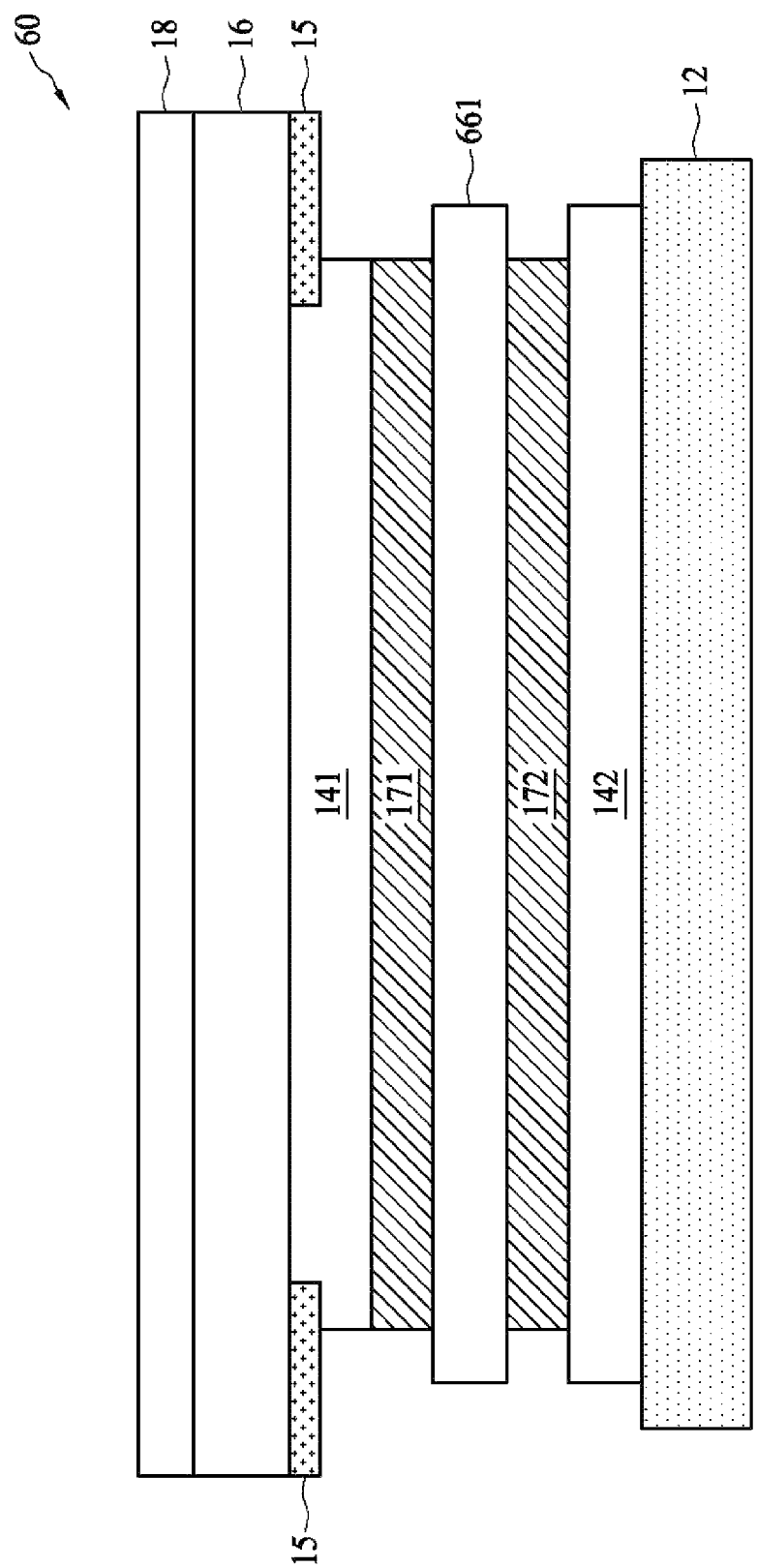

FIG. 6C is a schematic cross-sectional view of a touch-panel display device, in accordance with yet another embodiment of the present invention.

Figure 6D:
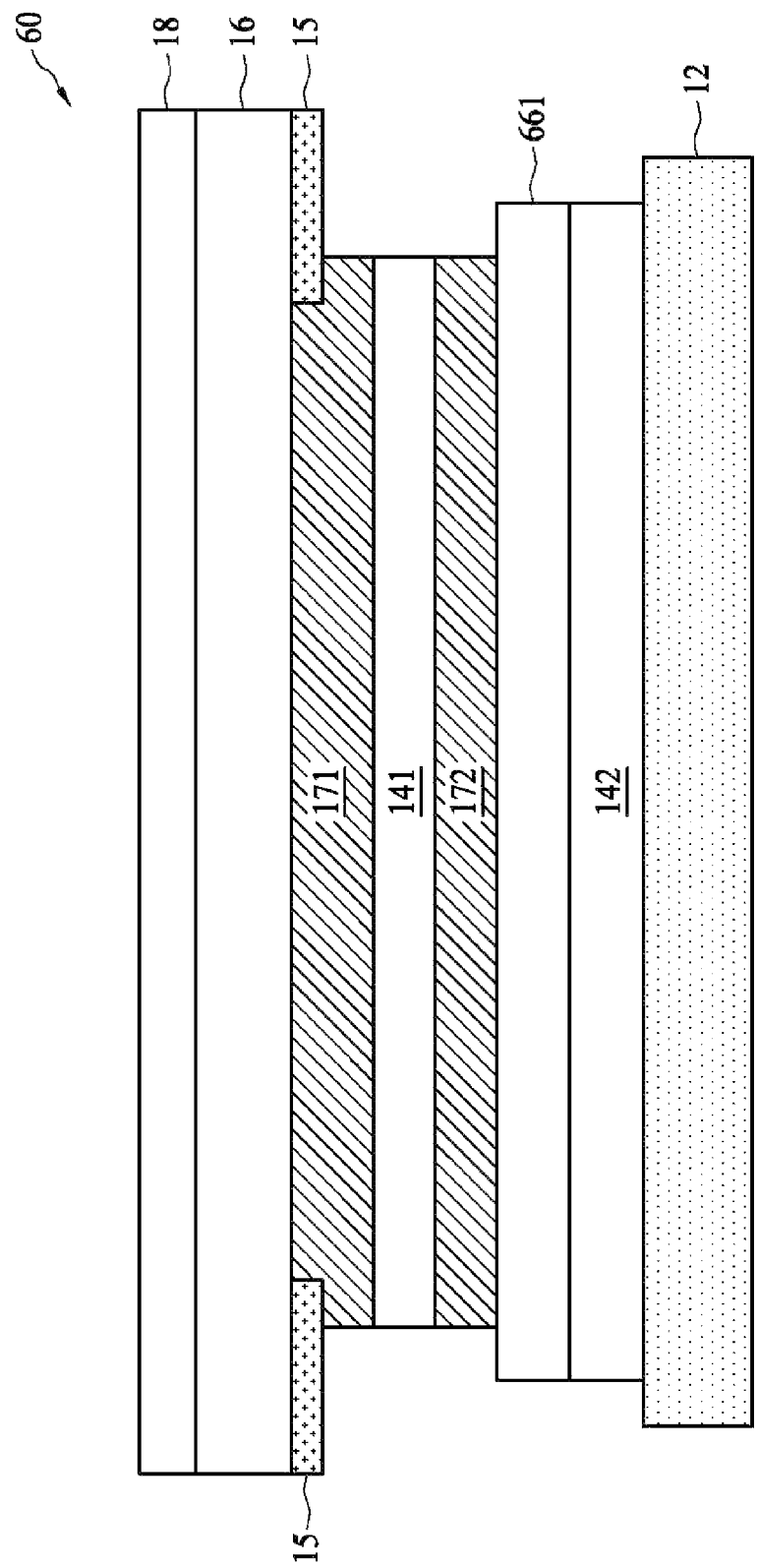

FIG. 6D is a schematic cross-sectional view of a touch-panel display device, in accordance with still another embodiment of the present invention.

Figure 6E:
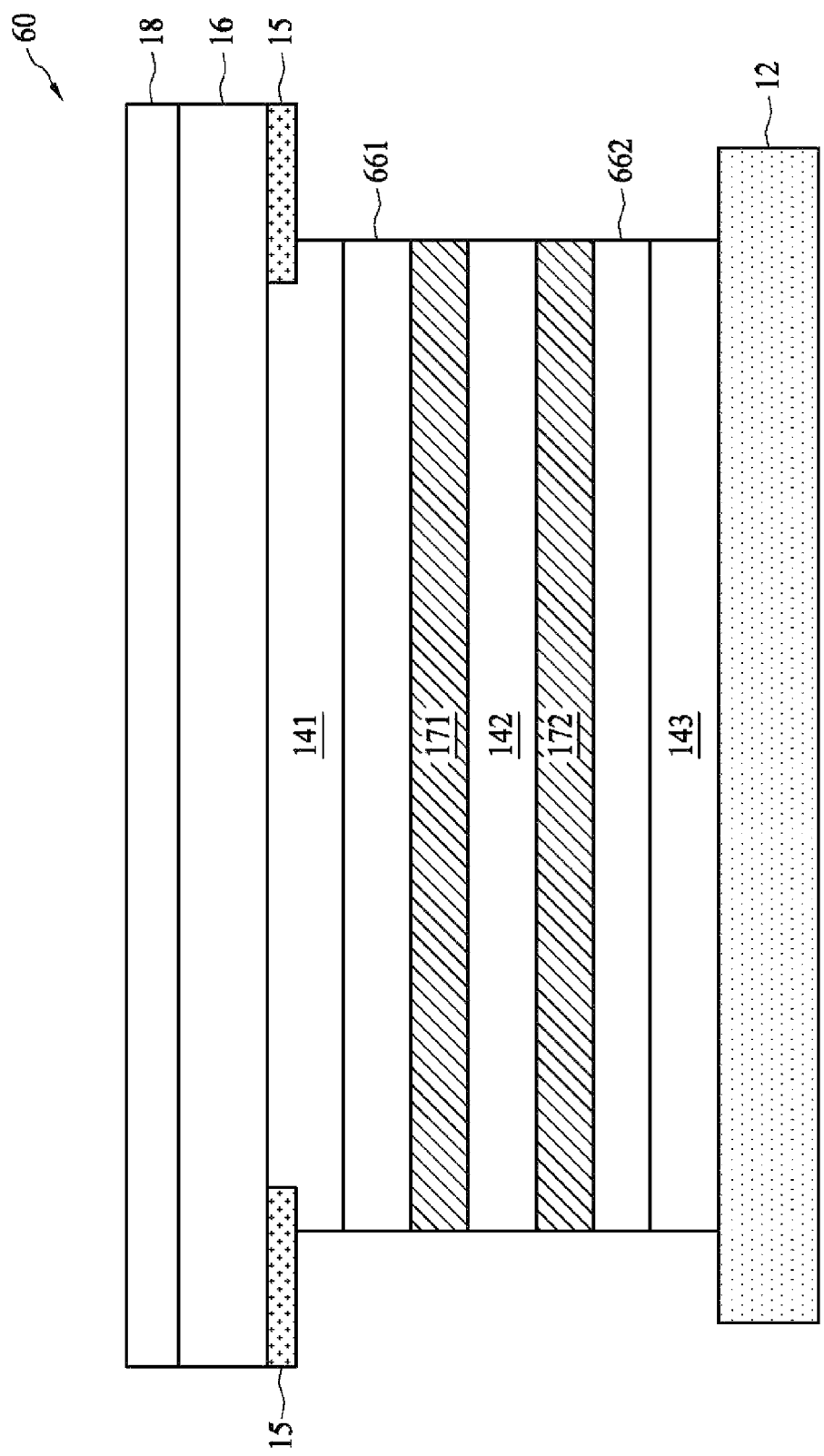

FIG. 6E is a schematic cross-sectional view of a touch-panel display device, in accordance with yet still another embodiment of the present invention.

DETAILED DESCRIPTION OF THE INVENTION

The embodiments of the present invention are shown in the following description with the drawings, wherein similar or same components are indicated by similar reference numbers.

FIG. 1A is a schematic cross-sectional view of a touch-panel display device 10, in accordance with an embodiment of the present invention. Referring to FIG. 1A, the touch-panel display device 10 includes a display module 12, a sensing module 13, an adhesive layer 14, a substrate 16 and a function layer 18.

The substrate 16 has a first surface 161 and a second surface 162, which are disposed on opposite sides of the substrate 16. The substrate 16 can be divided into a viewable area (not shown) and a non-viewable area (not shown) disposed at one or more sides of the viewable area. In the touch-panel display device 10, sensing electrodes (not shown) of the sensing module 13 are mainly located in the viewable area, while wiring lines and a masking layer (both not shown) are located in the non-viewable area. In an embodiment according to the present invention, the substrate 16 includes an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS).

The display module 12 is located proximal to the first surface 161 of the substrate 16. In some embodiments, the display module 12 includes a backlit display such as a liquid crystal display (LCD). In other embodiments, the display module 12 includes a self-emissive display such as an organic light emitting diode (OLED) display. The display module 12 is substantially similar in structure to existing LEDs and OLED displays except that, for example, a polarizer that would otherwise exist in the existing LEDs and OLED displays is eliminated. Instead, a function layer serves as the polarizer. The structure of the display module 12 will be further discussed with reference to FIGS. 1B and 1C.

The adhesive layer 14 functions to bond together the substrate 16 and the display module 12. In some embodiments, the adhesive layer 14 includes optical clear resin (OCR) or optical clear adhesive (OCA). In addition, the adhesive layer 14 may include glue or optically transmissive, double-sided adhesive tape.

The function layer 18 is located proximal to the second surface 162 of the substrate 16, and is configured to provide the function of a polarizer. In some embodiments, however, the function layer 18 is disposed on the first surface 161 of the substrate 16. In an embodiment, the function layer 18 includes a polarizer configured to polarize light emitting from the display module 12 towards the substrate 16. Suitable materials for the function layer 18 include highly optically transmissive polymer films such PVA, impregnated with a dichroic material such as iodine or dye. In an embodiment, the masking layer in the substrate 16 includes a material selected from black photo resist, black resin or black ink. Furthermore, as will be described in detail, the function layer 18 may extend into the non-viewable area so as to alleviate the problem of light leakage. In addition, the function layer 18 may fully cover the non-viewable area to reduce color difference between reflected light from the masking layer and that from the viewable area. As a result, the viewable area appears black, and is consistent in color with the non-viewable area, resulting in a real black appearance. Effectively, the sensing electrodes in the viewable area of the substrate 16 are concealed from view. Moreover, with the function of polarizing, the function layer 18 diminishes reflected light from the sensing electrodes in the viewable area of the substrate 16, which facilitates to conceal the sensing electrodes from view.

FIG. 1B is a schematic view of the display module 12, in accordance with an embodiment of the present invention. Referring to FIG. 1B, the display module 12 includes a liquid crystal (LC) module, which further includes a backlight unit 120, a first polarizer 121, a lower substrate 123, an LC layer 125 and an upper substrate 127. As compared to an existing LCD, the LC module according to the present invention replaces a polarizer (shown in a dotted block) with the function layer 18. The function layer 18 serves as a second polarizer for the LC module. In the structure of the LC module, the first polarizer 121 is configured to polarize light incident upon the LC layer 125, while the second polarizer (i.e., the function layer 18) is configured to polarize emergent light from the LC layer 125. In an embodiment according to the present invention, in the LC module the first polarizer 121 contributes to polarization in a first direction, while the second polarizer 18 contributes to polarization in a second direction and is configured to work in conjunction with the first polarizer 121 to polarize light emitting from the LC module towards the substrate 16. The first direction of polarization and the second direction of polarization are substantially orthogonal to each other.

FIG. 1C is a schematic view of the display module 12, in accordance with another embodiment of the present invention. Referring to FIG. 1C, the display module 12 includes an OLED module, which further includes a lower substrate 122, an organic light emitting layer 124 and an upper substrate 126. In some existing techniques, certain OLEDs employ metal anodes having relatively high reflectivity. Such OLEDs, when used under intense light in the outdoors, the ambient light may pass through the upper substrate and reflect from the metal anode, resulting in a deteriorated contrast. To enhance the contrast, generally a polarizer would be attached to the upper substrate. A polarized light beam created due to an incident light beam passing the polarizer enters a ¼ lambda compensation film, resulting in a circular polarized light beam having a positive phase shift of 45 degrees. The circular polarized light beam is then reflected by the metal anode, which causes a 180-degree phase shift. Consequently, the reflected circular polarized beam has a phase shift of 135 degrees with respect to the polarized light beam. Another polarized light beam is created after the reflected circular light beam passes the ¼ lambda compensation film in a reverse direction, resulting in a 90-degree phase shift. This polarized light beam now travels in a direction in parallel with the absorbing axis of the polarizer, and thus cannot pass the polarizer.

As compared to the existing OLEDs, the OLED module according to the present invention replaces a polarizer (shown in a dotted block) with the function layer 18. The function layer 18 serves as a polarizer for the OLED module, and is configured to polarize light emergent from the organic emitting layer 124 and block light, after incident upon the first surface 161 of the substrate 16, reflected by the OLED module 12. In an embodiment, the function layer 18 serves as a circular polarizer for the OLED module.

FIG. 2 is a schematic cross-sectional view of a touch-panel display device 20, in accordance with another embodiment of the present invention. Referring to FIG. 2, the touch-panel display device 20 has substantially the same components and structure as the touch-panel display device 10 described and illustrated with reference to FIG. 1A except that, for example, the touch-panel display device 20 further includes a coating 25 on the function layer 18. In some embodiments according to the present invention, the coating 25 includes one of an anti-split (AS) film, anti-glare (AG) film, anti-reflection (AR) film and anti-fingerprint (AF) film.

In the case that the coating 25 functions as an AS film, suitable materials for the coating 25 include polymethyl methacrylate (PMMA), triacetyl cellulose (TAC), polyethylene terephthalate (PET), polypropylene (PP), cyclo olefin polymer or a combination thereof. In an embodiment according to the present invention, the AS film has a thickness ranging between approximately 20 micrometers (um) and 1000 um. If the thickness is smaller than approximately 20 um, manufacturing complexity and cost may increase. Moreover, if the thickness is greater than approximately 1000 um, the AS film may hinder light from transmission and thus may adversely affect visibility.

In the case that the coating 25 functions as an AG film, suitable materials for the coating 25 include silicon dioxide. The haze of the AG film ranges between approximately 1% and 2%, which facilitates light scattering and prevents Newton's rings.

In the case that the coating 25 functions as an AF film, suitable materials for the coating 25 include polymer, metal oxide and nano-sol.

In the case that the coating 25 functions as an AR film, suitable materials for the coating 25 include chromium (Cr), or fluoride such as Teflon and calcium fluoride ($CaF_2$).

FIG. 3A is a schematic view of a function layer 181 of a touch-panel display device 31, in accordance with an embodiment of the present invention. Referring to FIG. 3A, the touch-panel display device 31 has substantially the same components and structure as the touch-panel display device 10 described and illustrated with reference to FIG. 1A except that, for example, the function layer 181 of the touch-panel display device 31 provides anti-glare function in addition to the polarization function. The function layer 181 includes a roughened surface for diffuse reflection of incident light. In an embodiment according to the present invention, the roughened surface is formed by etching, for example, the surface of the function layer 181, resulting in a lump-and-pit structure across the surface. The lump-and-pit structure facilitates divergence of incident light.

FIG. 3B is a schematic view of a function layer 182 of a touch-panel display device 32, in accordance with an embodiment of the present invention. Referring to FIG. 3B, the touch-panel display device 32 has substantially the same components and structure as the touch-panel display device 10 described and illustrated with reference to FIG. 1A except that, for example, the function layer 182 of the touch-panel display device 32 provides anti-glare function in addition to the polarization function. The function layer 182 includes a hazed surface for diffuse reflection of incident light. In an embodiment according to the present invention, the hazed surface is formed by nano-coating, for example, the function layer 182, resulting in a fine-particle structure across the surface. The fine-particle structure facilitates divergence of incident light.

FIG. 4 is a schematic cross-sectional view of a touch-panel display device 40, in accordance with yet another embodiment of the present invention. The display module 12 of the touch-panel display device 40 includes an LC module comprising a first polarizer 121. Referring to FIG. 4, the touch-panel display device 40 has substantially the same components and structure as the touch-panel display device 10 described and illustrated with reference to FIG. 1A except, for example, a function layer 48 of the touch-panel display device 40. The function layer 48 is configured to serve as a second polarizer for the touch-panel display device 40, and has a size larger than the first polarizer 121. Some existing LCDs are liable to leakage of light because the size of polarizers is smaller than that of the substrate of the LCD. According to the embodiments of the present invention, since the functional layer 48 that serves as a second polarizer is separate from the LC module, the second polarizer can be designed with a larger size than the first polarizer 121. Effectively, the leakage of light can be alleviated or overcome. The problem of light leakage will be further discussed with reference to FIG. 5B.

In another embodiment according to the present invention, the display module 12 of the touch-panel display device 40 includes an OLED module. In that case, the function layer 48 that serves as a second polarizer has a size not smaller than the OLED module. Effectively, the problem of light leakage can be alleviated or overcome.

FIG. 5A is a schematic cross-sectional view of a touch-panel display device 50, in accordance with still another embodiment of the present invention. Referring to FIG. 5A, the substrate 16 of the touch-panel display device 50 is divided into a viewable area VW and at least one non-viewable area NVW beside the viewable area VW. Sensing electrodes (not shown) of the touch-panel display device 50 are mainly disposed in the viewable area VW, while wiring lines and a masking layer 15 are disposed in the at least one non-viewable area NVW. Moreover, a function layer 581 of the touch-panel display device 50 covers only the viewable area VW of the substrate 16. With this configuration, color difference in the viewable area VW due to a line of etch between an etched region and a non-etched region (such as an ITO region) can be alleviated. Such color difference obviously would adversely affect the appearance of the touch-panel display device 50. Furthermore, since the function layer 581 simply covers the viewable area VW of the substrate 16, manufacturing cost can hence be decreased. However, a portion of light emitting from the backlight unit 120 of the display module 12 and passing the substrate 16 may not enter the function layer 16, and thus may cause the problem of light leakage.

FIG. 5B is a schematic cross-sectional view of the touch-panel display device 50, in accordance with yet still another embodiment of the present invention. Referring to FIG. 5B, a function layer 582 of the touch-panel display device 50 not only covers the viewable area VW of the substrate 16 but also extends into the at least one non-viewable area NVW. In an embodiment according to the present invention, the function layer 582 extends a length d of approximately 0.1 millimeter (mm) to 0.2 mm from the viewable area VW into the at least one non-viewable area NVW. The extended portion of the function layer 582 allows the light emitting from the backlight unit 120 to pass, after times of refraction, the substrate 16 (having an index of refraction of approximately 1.5, substantially equal to that of the adhesive layer 14) and reach the function layer 582, as shown by arrows. Effectively, the problem of light leakage is alleviated.

FIG. 5C is a schematic cross-sectional view of the touch-panel display device 50, in accordance with a further embodiment of the present invention. Referring to FIG. 5C, a function layer 583 of the touch-panel display device 50 fully covers the viewable area VW and the at least one non-viewable area NVW of the substrate 16. With this configuration, the function layer 583 reduces the color difference between reflected light from the masking layer 15 and that from the viewable area VW so that the viewable area VW and the at least one non-viewable area NVW appear to have a consistent color. Effectively, the problem of color difference is alleviated.

FIG. 6A is a schematic cross-sectional view of a touch-panel display device 60, in accordance with an embodiment of the present invention. Referring to FIG. 6A, the touch-panel display device 60 includes a sensing electrode layer 17 on the first surface 161 of the substrate 16. The sensing electrode layer 17 is attached to the display module 12 by the adhesive layer 14. In an embodiment according to the present invention, the sensing electrode layer 17 is formed in a first pattern in which electrodes are arranged in rows (or columns) and are spaced at regular intervals one row (or column) from another. In another embodiment, the sensing electrode layer 17 is formed in a second pattern in which a set of electrodes arranged in rows is staggered with another set of electrodes arranged in columns. Moreover, suitable materials for the sensing electrode layer 17 include, but are not limited to, metal oxides, nanometals, carbon nanotubes and graphene.

FIG. 6B is a schematic cross-sectional view of the touch-panel display device 60, in accordance with another embodiment of the present invention. Referring to FIG. 6B, the touch-panel display device 60 includes a first carrier 661 between the substrate 16 and the display module 12. The sensing electrode layer 17, disposed on a surface of the first carrier 661, is attached to the substrate 16 by a first adhesive layer 141. Moreover, the opposite surface of the first carrier 661 is attached to the display module by a second adhesive layer 142. In an embodiment according to the present invention, the first carrier 661 includes an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS). In some embodiments, the sensing electrode layer 17 is arranged in the above-mentioned first electrode pattern or the second electrode pattern. Moreover, the first adhesive layer 141 and the second adhesive layer 142 include optical clear resin or optical clear adhesive.

FIG. 6C is a schematic cross-sectional view of the touch-panel display device 60, in accordance with yet another embodiment of the present invention. Referring to FIG. 6C, a first sensing electrode layer 171, disposed on a surface of the first carrier 661, is attached to the substrate 16 by the first adhesive layer 141. Moreover, a second sensing electrode layer 172, disposed on the opposite surface of the first carrier 661, is attached to the display module 12 by the second adhesive layer 142. In an embodiment according to the present invention, the first sensing electrode layer 171 includes first electrodes arranged in a first direction, while the second sensing electrode layer 172 includes second electrodes arranged in a second direction, which is substantially orthogonal to the first direction. Moreover, suitable materials for the first sensing electrode layer 171 and the second sensing electrode layer 172 include, but are not limited to, metal oxides, nanometals, carbon nanotubes and graphene.

FIG. 6D is a schematic cross-sectional view of the touch-panel display device 60, in accordance with still another embodiment of the present invention. Referring to FIG. 6D, the first sensing electrode layer 171 is disposed on a surface of the substrate 16, while the second sensing electrode layer 172 is disposed on a surface of the first carrier 661. The first sensing electrode layer 171 and the second sensing electrode layer 172 are attached to each other by the first adhesive layer 141. Moreover, the opposite surface of the first carrier 661 is attached to the display module 12 by the second adhesive layer 142.

FIG. 6E is a schematic cross-sectional view of the touch-panel display device 60, in accordance with yet still another embodiment of the present invention. Referring to FIG. 6E, the touch-panel display device 60 includes, in addition to the first carrier 661 between the substrate 16 and the display module 12, a second carrier 662 between the first carrier 661 and the display module 12. The first sensing electrode layer 171 is disposed on a surface of the first carrier 661, while the second sensing electrode layer 172 is disposed on a surface of the second carrier 662. The opposite surface of the first carrier 661 is attached to the substrate 16 by the first adhesive layer 141. Moreover, the first sensing electrode layer 171 and the second sensing electrode layer 172 are attached to each other by the second adhesive layer 142. Furthermore, the opposite surface of the second carrier 662 is attached to the display module 12 by a third adhesive layer 143. In an embodiment according to the present invention, the second carrier 662 includes an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS). In some embodiments, the third adhesive layer 143 includes optical clear resin or optical clear adhesive.

Although the present invention and its advantages have been described in detail, it should be understood that various changes, substitutions and alterations can be made herein without departing from the spirit and scope of the invention as defined by the appended claims. For example, embodiments of the present invention may be applicable to single-sided indium tin oxide (SITO) touch panels or double-sided indium tin oxide (DITO) touch panels. The SITO structure includes a diamond-like electrode pattern, in which x-axis electrodes and y-axis electrodes are formed on a same side of a glass substrate. As to the DITO structure, x-axis electrodes and y-axis electrodes are formed on opposite sides of a glass substrate.

The scope of the present disclosure is not intended to be limited to the particular embodiments of the process, machine, methods and steps described in the specification. As persons having ordinary skill in the art will readily appreciate from the disclosure of the present invention, processes, machines, methods or steps, presently existing or later to be developed, that perform substantially the same function or achieve substantially the same result as the corresponding embodiments described herein may be utilized according to the present invention. Accordingly, the appended claims are intended to include within their scope such processes, machines, methods or steps.

What is claimed is:

1. A touch-panel display device, comprising:
a substrate having a first surface and a second surface diametrically opposite the first surface, wherein the substrate is divided into a viewable area and a non-viewable area distinct from the viewable area;
a masking layer that is directly in contact with the first surface of the substrate;
a first sensing electrode layer disposed directly on a first carrier substrate;
a first adhesive layer disposed between the substrate and the first carrier substrate, wherein the first adhesive layer is directly in contact with a sidewall and a bottom surface of the masking layer
a second adhesive layer that is directly in contact with the first sensing electrode layer;
a second sensing electrode layer in contact with the second adhesive layer;
a second carrier substrate that is directly in contact with the second sensing electrode layer;
a display module;
a third adhesive layer disposed directly between the display module and the second carrier substrate; and
a function layer in contact with the second surface of the substrate, wherein:
the function layer comprises a transmissive polymer film impregnated with a dichroic material; and
polarization of the function layer diminishes light reflected from sensing electrodes, disposed within the first sensing electrode layer and the second sensing electrode layer, concealing the sensing electrodes from the viewable area.

2. The touch-panel display device of claim 1, wherein:
the display module comprises a liquid crystal module comprising a liquid crystal layer and a first polarizer configured to polarize light incident upon the liquid crystal layer, and
a polarization direction of the first polarizer is orthogonal to a polarization direction of the function layer.

3. The touch-panel display device of claim 1, wherein the function layer only covers the viewable area.

4. The touch-panel display device of claim 1, wherein the function layer covers the viewable area and extends into the non-viewable area.

5. The touch-panel display device of claim 4, wherein the function layer extends a length of 0.1 millimeter (mm) to 0.2 mm from the viewable area into the non-viewable area of the substrate.

6. The touch-panel display device of claim 1, wherein the function layer covers the viewable area and the non-viewable area of the substrate.

7. The touch-panel display device of claim 1, further comprising a coating, wherein the coating comprises one of an anti-split (AS) film, an anti-glare (AG) film, an anti-reflection (AR) film or an anti-fingerprint (AF) film.

8. The touch-panel display device of claim 1, wherein the substrate comprises an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS).

9. The touch-panel display device of claim 1, wherein at least one of the first sensing electrode layer or the second sensing electrode layer comprises a material selected from one of metal oxides, nanometals, carbon nanotubes and graphene.

10. The touch-panel display device of claim 1, wherein the first carrier substrate comprises an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS).

11. The touch-panel display device of claim 1, wherein the second carrier substrate comprises an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS).

12. The touch-panel display device of claim 11, wherein the first carrier substrate comprises an optically transmissive material selected from glass, polymethyl methacrylate (PMMA), polyvinyl chloride (PVC), polypropylene (PP), polyethylene terephthalate (PET), polyethylene naphthalate (PEN), polycarbonate (PC) and polystyrene (PS).

\* \* \* \* \*